United States Patent [19]

Pukaite

[11] 4,453,903

[45] Jun. 12, 1984

[54] INSERT MOLDING GATE DESIGN FOR ENCAPSULATING ELECTRONIC CERAMICS WITH THERMOPLASTIC MATERIALS

[75] Inventor: Clifford J. Pukaite, Mequon, Wis.

[73] Assignee: North American Philips Corporation, New York, N.Y.

[21] Appl. No.: 476,973

[22] Filed: Mar. 21, 1983

Related U.S. Application Data

[63] Continuation of Ser. No. 254,571, Apr. 15, 1981, abandoned.

[51] Int. Cl.³ .......................... B29C 1/00; B29D 3/00; B29F 1/10
[52] U.S. Cl. ..................................... 425/117; 249/95; 425/129 R; 425/572
[58] Field of Search ..................... 264/272.15, 272.18, 264/272.19, 328.9; 425/129 R, 572; 249/95

[56] References Cited

U.S. PATENT DOCUMENTS 3,626,051 12/1971 Liantand ..................... 264/272.19
4,314,960 2/1982 Hess ............................ 264/272.15

Primary Examiner—Willard E. Hoag
Attorney, Agent, or Firm—Jack E. Haken; James J. Cannon, Jr.

[57] ABSTRACT

An insert molding gate for encapsulating fragile electronic ceramics having a multiplicity of gate orifices located near the edges of the cavity within said mold, said orifices being positioned to permit the injection of thermoplastic material into said mold cavity in approximately equal volumes on all free sides of the electronic device being encapsulated, the side of said mold opposite said gate orifices being configured to form a terminal lead clamp comb for rigidly positioning the ceramic substrate centrally within said mold cavity by clamping its terminal leads in said comb.

1 Claim, 4 Drawing Figures

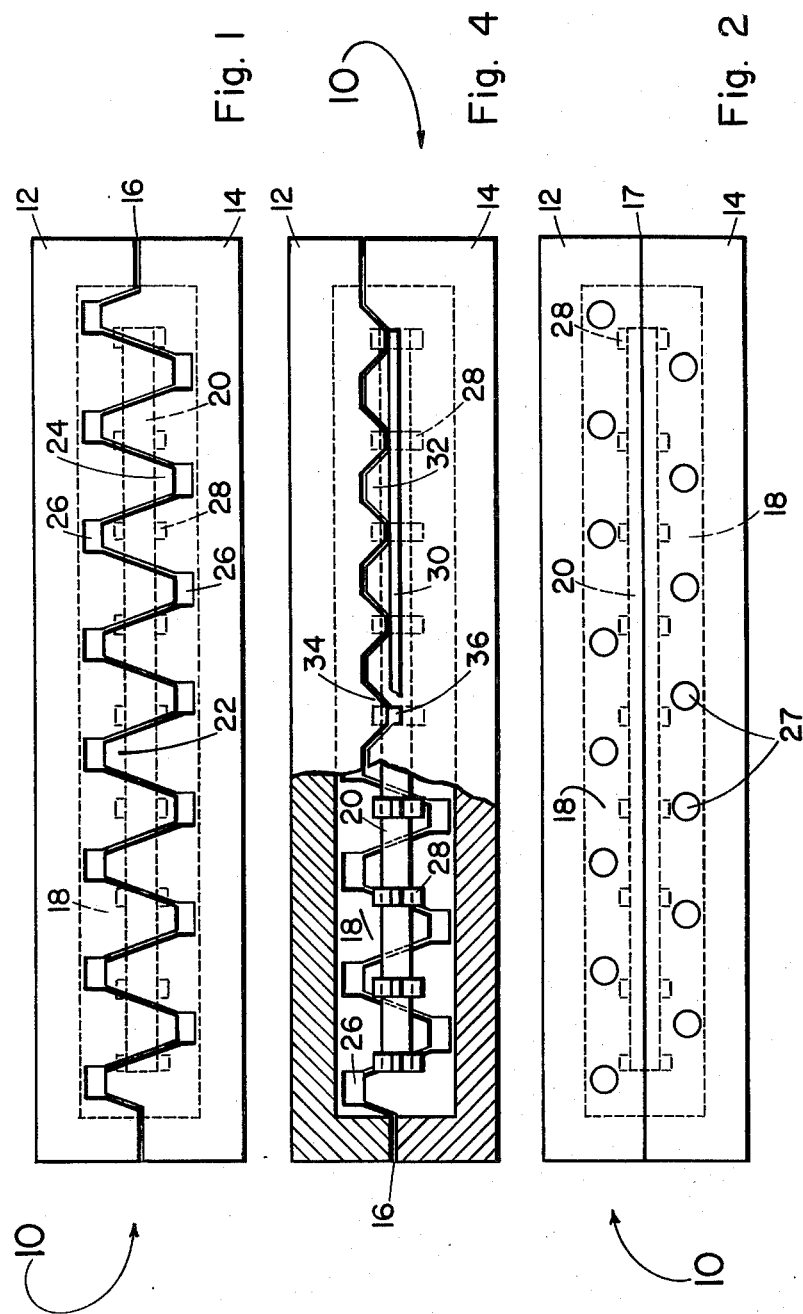

INSERT MOLDING GATE DESIGN FOR ENCAPSULATING ELECTRONIC CERAMICS WITH THERMOPLASTIC MATERIALS

This is a continuation of application Ser. No. 254,571, filed Apr. 15, 1981 abandoned.

BACKGROUND OF THE INVENTION

1. Field of the Invention

This invention pertains to a mold gate design for encapsulating leaded electronic ceramics, ceramic resistor networks or other fragile electronic articles, hereinafter referred to as substrates, in thermoplastic material by means of insert molding. Insert molding is a plastic molding technique which enables the partial or complete covering of an article with plastic to produce a desired shape and/or dimension. In the molding process the article to be encapsulated is clamped in the mold cavity and then molten plastic is injected into the cavity under pressure to surround the article in the desired way.

2. Description of the Prior Art

It is common now in the electronics industry to encapsulate electronic devices in thermoset plastic material. The primary advantage is that thermoset plastic materials possess an ease of processing due to an intrinsically lower viscosity than thermoplastics. The lower viscosity permits lower injection pressures and slower injection rates, thus not causing the electronic ceramics to be broken. However, these advantages of thermoset plastic may be overcome with the present invention.

There are a number of reasons for wanting to encapsulate electronic devices in thermoplastic material rather than in thermoset plastic material. Thermoplastic materials are more economical than thermoset plastic materials. There is little or no waste with thermoplastics because they may be recycled, whereas thermoset materials cannot be recycled. The processing times for thermoplastics are relatively short, about 20 seconds, while thermosets require 2 to 3 minutes of process time. Because of the faster process time, thermoplastic molds can be smaller (having fewer cavities) for equal production rates with thermoset plastic materials. Thermoplastics also cause less internal stress on an encapsulated device because they do not adhere to the device as thermosets do. Examples of thermoplastic materials are polybutylene terephthalate, polyethylene terephthalate, and polyphenylene sulfide. Examples of thermoset plastic are diallyl phthalate or phenolic resins.

Two problems have been encountered when attempting to encapsulate fragile electronic ceramic substrates in thermoplastics. The first problem is one of controlling the position of the article in the mold cavity so that when the plastic is injected into the mold cavity, the device is completely encapsulated and centered in the plastic. The second problem is to inject the plastic into the mold cavity in such a way that it does not create unbalanced forces which will cause the device to be broken or distorted.

Several methods of encapsulating fragile electronic devices in thermoplastic have not been successful when tried, nor have successful methods been described in the literature. Mechanical means of prepositioning the electronic device and subsequently removing the positioning mechanism either prior to or simultaneously with the injection of the thermoplastic through other types of gate orifices have resulted in excessive device breakage or incomplete encapsulation due to the forcing of the device to one side of the mold cavity. Unsuccessful gate designs include a single large rectangular gate orifice located at the parting line of the mold cavity; a single round gate orifice split by a metal insert located in the nozzle of the injection machine; and two dual gate designs with one orifice located in the top half of the gate and one orifice located in the bottom half of the gate. These gates orifices were all located at the center line of the gate and mold cavity. Additionally, these gate designs were tried with and without the aid of positioning pins used to locate the device to be encapsulated in the center of the mold cavity. With each of these gate designs, excessive numbers of parts were either broken in molding or incompletely encapsulated as a result of being moved to the edge of the cavity during the injection of the plastic.

SUMMARY OF THE INVENTION

This invention is an insert molding gate design for encapsulating fragile leaded electronic ceramics, substrates or devices and consists of a molding gate having a multiplicity of gate orifices located near the edges of the mold cavity. The orifices are positioned in such a way as to permit the introduction of the thermoplastic material into the mold cavity in roughly equal volumes on all free sides of the electronic device being encapsulated. The side of the mold opposite the gate orifices has somewhat smaller orifices which, when the gates are closed, serve as a lead clamp comb which clamps the leads between the ceramic substrate and a terminal carrier strip. By positioning the injection orifices and the lead clamp comb appropriately on opposed sides of the upper and lower gates, the ceramic is centrally positioned within the gate and the thermoplastic can be introduced into the mold cavity in roughly equal volumes on all free sides as mentioned previously. In the preferred embodiment of the injection orifices of the gates, removal of the plastic from the orifices is relatively simple. By using a multiplicity of gate orifices located at the mold cavity edges, the ceramic resistor network, substrate or other device, clamped by its leads near the center of the mold cavity through the comb at the opposite side of the mold cavity edge, is surrounded by the thermoplastic in a uniform way, preventing deflection of the article to the cavity wall. By inhibiting any deflection of the ceramic substrate, the part is completely encapsulated, centered in the plastic and not broken. Furthermore, filling of the mold cavity through a multiplicity of orifices located on both sides of the substrate, prevents unequal forces from being placed on the substrate or ceramic resistor network. This eliminates the breaking of the ceramic which, with other gate designs, amounted to greater than 20% of a batch. With the present invention, when the high molding pressures of thermoplastic injection molding are finally applied, the article is surrounded with plastic and the force is hydrostatically applied. Since hydrostatically applied pressure (force) is uniform in all directions, the ceramic substrate or resistor will not be broken.

The prime goal of the invention is to produce machine insertable, single in-line resistor networks. A fixed shape and dimensional tolerance are important considerations for the products made with this invention because they are intended for mechanical or mechanically aided insertion into electronic circuits. Other uses of the invention will be obvious to those skilled in the art.

BRIEF DESCRIPTION OF THE DRAWINGS

FIG. 1 is a view of the multiple orifice side of the insert molding gate for the encapsulation of electronic ceramics with thermoplastic material according to the invention.

FIG. 2 shows an alternate embodiment of the multiple orifice insert molding gate.

FIG. 4 is a view of the multiple orifice side of the embodiment of FIGS. 1 and 3 showing the relative position of the lead clamp comb.

DESCRIPTION OF THE PREFERRED EMBODIMENT

Figure 3:
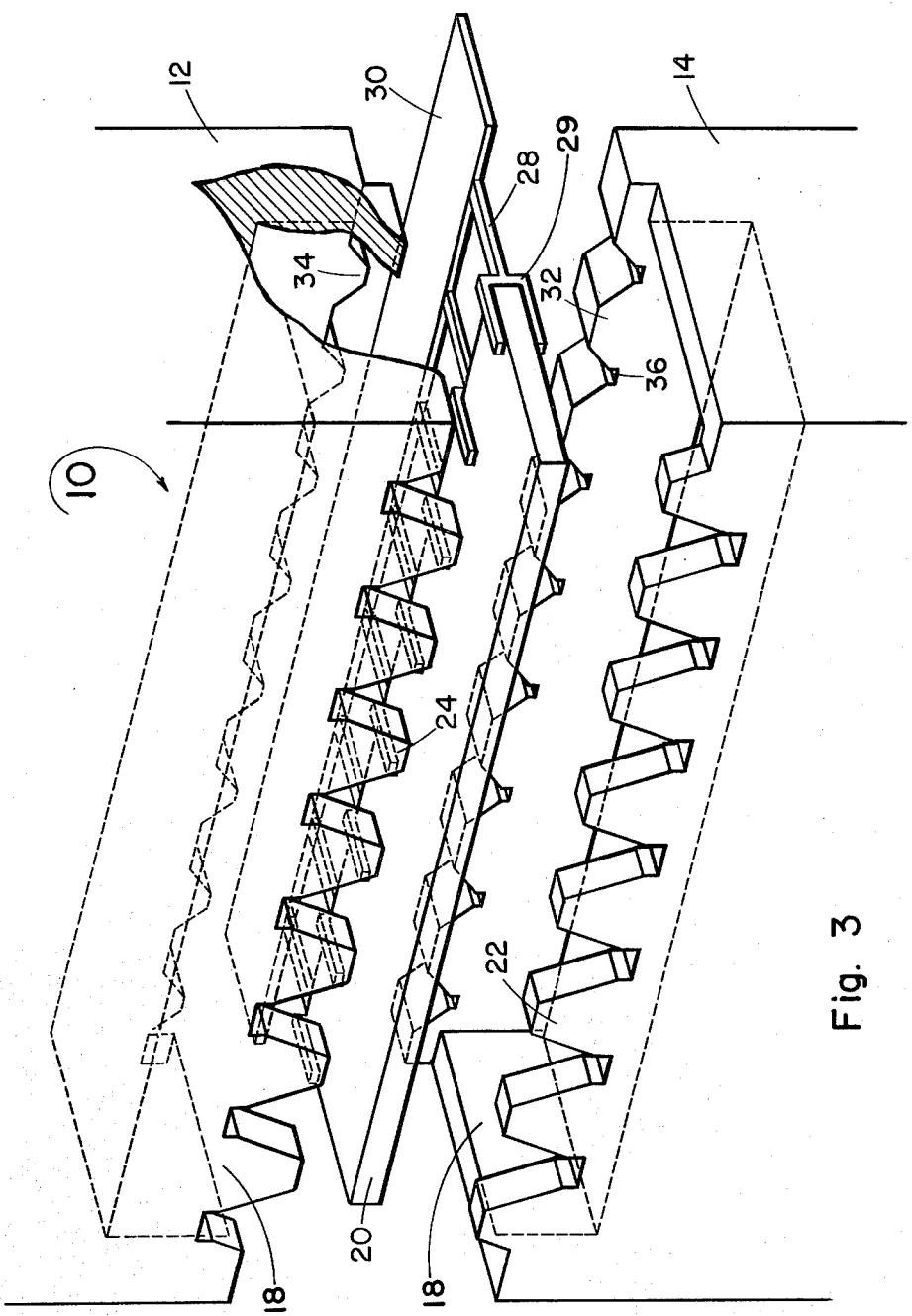
FIG. 3 is a partially cut-away perspective view of the multiple orifice insert molding gate in an open position.

The preferred embodiment of the insert molding gate for encapsulating fragile leaded electronic ceramics, substrates or devices is illustrated in FIG. 1. In FIG. 1 gate 10 consists of an upper gate member 12 and a lower gate member 14, the upper gate member 12 being referred to as the top of gate 10 and the lower gate member 14 being referred to as the bottom of gate 10, the top and bottom being separated by a parting line 16. The top 12 and the bottom 14 of gate 10 define a mold cavity 18 in which a ceramic substrate or other device 20 may be placed for encapsulation by a thermoplastic material. On the multiple orifice side of gate 10 parting line 16, which defines the division between upper gate member 12 and lower gate member 14, in the preferred embodiment, has a generally sawtooth configuration on one side such that parting line 16 defines complementary fingers 22, 24 in lower gate member 14 and upper gate member 12 respectively. Fingers 22, 24 are truncated so that they define in a closed position a plurality of orifices 26 in the upper and lower members 12, 14 of insert molding gate 10. Orifices 26 are illustrated in FIG. 1 as having a generally rectangular shape. Orifices 26 provide a plurality of openings above and below the center line of cavity 18 along which substrate 20 is positioned for the injection of a thermoplastic material around the free sides of substrate 20 according to the invention. Orifices 26, located near the edges of the upper and lower gate numbers of mold cavity 18, are positioned in such a way as to permit the introduction of the thermoplastic into the mold cavity 18 in roughly equal volumes on all free sides of the electronic substrate or device 20 being encapsulated. FIG. 1 illustrates the preferred embodiment of insert mold gate 10. It should be noted that removal of plastic from orifices 26 of gate 10 is relatively simple since they are positioned along sawtooth shaped parting line 16.

FIG. 2 illustrates an alternative design for providing a multiplicity of orifices in insert molding gate 10. In this figure corresponding parts are assigned reference numerals corresponding to those in FIG. 1. In FIG. 2, parting line 17 between upper gate portion 12 and lower gate portion 14 is simply a straight edge, the sawtooth design not being utilized. Orifices 27 are of a generally circular shape, again positioned near the edges of the upper and lower gate members of the mold cavity in such a way as to permit the introduction of the thermoplastic into the mold cavity in roughly equal volumes on all free sides of the electronic substrate device 20 being encapsulated. However, the multiple orifice gate design of FIG. 2 is not preferred because of the difficulty in removing excess plastic from the gate orifices 27.

FIG. 3 is a partially cut-away, perspective, exploded view of the multiple orifice insert molding gate of the preferred embodiment of FIG. 1. In FIG. 3, there is shown the means by which the ceramic substrate 20 is held in position within cavity 18. Leads 28 are attached to one edge of substrate 20 in a conventional manner with U-shaped clips 29. The other end of leads 28 are attached to a conventional terminal carrier strip 30. In order to accomplish the purpose of the present invention, the substrate 20 must be rigidly clamped in a centered position within cavity 18. This is accomplished by having the upper and lower members 12, 14 of gate 10 clamp leads 28 at a point between U-clips 29 and terminal lead carrier strip 30. To effect this clamping action the side edges of upper and lower gate members 12, 14 are configured to serve as a lead clamp comb.

To this end, the side walls of upper and lower gate members 12, 14 opposed to the injection orifice side walls are likewise configured in a modified sawtooth variation such that the complementary teeth 32, 34 each serve at their tips to clamp leads 28 in small orifices 36 in a fixed position along parting line 16 of mold 10.

Thus, by using a multiplicity of gate orifices located at the mold cavity edges on one side of gate 10 and a multiplicity of clamping means on the other side of gate 10, the ceramic resistor network, substrate, or other device, clamped by its leads near the center of mold cavity 18 is surrounded by thermoplastic in a uniform way, thereby preventing deflection of the article to cavity wall. By inhibiting any deflection of the ceramic or substrate, the part is completely encapsulated, centered in the plastic and not broken. Furthermore, filling of the mold cavity through the multiplicity of orifices located on both sides of the substrate, prevents unequal forces from being applied on the ceramic resistor network, eliminating the breaking of the ceramic which, with other gate designs amounted to greater than 20% of the batch. With the insert molding gate of the present invention, when high molding pressures of thermoplastic injection molding are finally applied, the article is surrounded with plastic and the force is hydrostatically applied. Since hydrostatically applied pressure is uniform in all directions, the ceramic substrate or resistor network will not be broken.

FIG. 4 illustrates the relative position of multiple gate orifices 26 and the lead clamp comb orifices 36 on opposed sides of gate 10.

What is claimed:

1. An insert molding gate for completely encapsulating leaded electronic ceramic substrates with thermoplastic materials comprising:

an upper member and a lower member of said gate, said members being separable along a parting line;

said upper and said lower members defining a mold cavity within said gate;

complementary sawtooth edges comprised of a plurality of teeth, each tooth having truncated peaks, integrally formed with and dividing one side of said upper and said lower gate members such that the truncated peaks of said teeth define small orifices along said parting line to serve as a lead clamp comb for gripping the terminal leads of said electronic ceramic substrates;

complementary sawtooth edges comprised of a plurality of teeth, said edges integrally formed with and dividing said upper and lower gate members along a section of said parting line of the side of said upper and lower gate members opposed to said lead clamp comb, configured such that peaks of alternate teeth of said edges extend above and below said parting line of said gate, said teeth being truncated to define orifices on both sides of said parting line near the edges of said cavity, said orifices positioned such that said orifices permit the injection of thermoplastic material on all free sides of said electronic ceramic substrate to effect the complete encapsultation thereof.

* * * * *